United States Patent Office 2,895,984
Patented July 21, 1959

2,895,984

ORGANOPHOSPHORUS COMPOUNDS DERIVED FROM PHOSPHOROTHIOLOTHIONATES AND EPOXIDES

Marvin A. McCall and Richard L. McConnell, Kingsport, Tenn., assignors to Eastman Kodak Company, Rochester, N.Y., a corporation of New Jersey No Drawing. Application August 12, 1957
Serial No. 677,759

12 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with certain epoxy compounds and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates with certain epoxides. The new products of this invention have the structural formula:

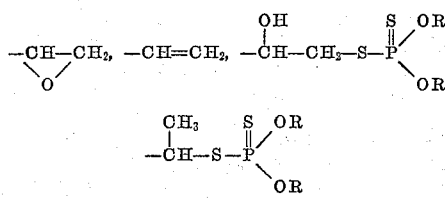

wherein $R_1$ is selected from the group consisting of hydrogen and the following organic radicals:

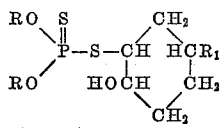

In the above structural formula and in the definition of $R_1$ R is a lower alkyl radical containing from 1 to 4 carbon atoms.

In preparing the products of this invention, dialkyl phosphorothiolothionates having the following structural formula are used:

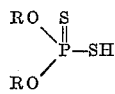

wherein R is a lower alkyl radical containing from 1 to 4 carbon atoms. The epoxides that are used in preparing the compounds of this invention have the structural formula:

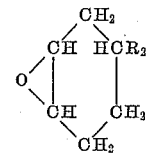

wherein $R_2$ is selected from the group consisting of hydrogen, $$-CH-\!\!-\!\!CH_2, \text{ and } CH=CH_2$$
$$\diagdown\!\!O\!\!\diagup$$

In the practice of this invention we prefer to add one of the reactants gradually to a reactor containing the other reactant. For example, the epoxide can be added gradually to a reactor containing the dialkylphosphorothiolothionate. Alternatively however, the reverse procedure of addition of reactants can be used and the dialkylphosphorothiolothionate can be added to a reactor containing the epoxide. Normally it is desirable to employ a reactor provided with adequate means of agitation and, since the reaction is quite exothermic, it is also desirable to employ a reactor that is provided with adequate cooling means.

The operable temperature range for the reaction is generally from 0 to 150° C. and the preferred temperature range is from 25 to 100° C. However, it will be realized that in some instances temperatures outside this range can be employed. The reaction time usually varies from 0.5 to 8 hours, but longer and shorter reaction periods are sometimes used. Normally it is unnecessary to employ a catalyst for the reaction since the dialkylphosphorothiolothionate will react with the epoxide to open the epoxy ring in the absence of a catalyst. If it is considered desirable to employ a catalyst, there are certain catalysts that can be used. For example, the tertiary amines, such as triethyl amine, and the like, and etherates of boron trifluoride.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. This is particularly true when the epoxide contains only a single epoxy ring and no unsaturated radicals attached to the cyclohexyl ring. In those instances where the epoxide contains two epoxy rings or one or more unsaturated radicals attached to the cyclohexyl ring, it is desirable to use two or more moles of the dialkyl phosphorothiolothionate per mole of the epoxide.

The dialkylphosphorothiolothionates that are used in our invention can be prepared by the known reaction of 4 moles of an aliphatic alcohol with one mole of phosphorus pentasulfide. The epoxides that are used in our reaction can be prepared from the corresponding olefin by oxidation in the presence of peracids, such as perbenzoic or peracetic acid. Alternatively, the epoxides can be prepared by the dehydrohalogenation of the corresponding halohydrin.

The following examples are illustrative of the compounds within the scope of this invention, their method of preparation and their utility as insecticides.

*Example 1.—O,O-diethyl S-(2-hydroxycyclohexyl) phosphorothiolothionate*

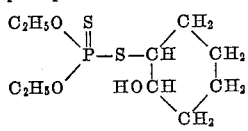

1,2-epoxycyclohexane (0.1 mole) was added dropwise with stirring to O,O-diethyl phosphorothiolothionate (0.1 mole, neutral equivalent 210). The temperature rose rapidly to 50–70° C. The exothermic reaction was controlled by the rate of addition and by external cooling when needed. After the addition was complete and the initial heat of reaction had subsided, the reaction mixture was heated on the steam bath with stirring for 2 hrs. The product was then vacuum stripped at 10–25 mm. pressure to remove any unreacted or low boiling impurities.

*Example 2.—O,O-diethyl S-(2-hydroxy-5-epoxyethyl- cyclohexyl) phosphorothiolothionate*

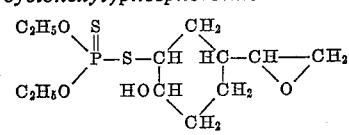

Addition product of 1 mole of vinylcyclohexane dioxide to 1 mole of diethyl phosphorothiolothionate was obtained by the same reaction procedure as described in Example 1. The refractive index of the product was $n_D^{20}$ —1.5330.

*Example 3.—O,O - diethyl S-[2 - hydroxy - 5 - (2-diethylphosphorothiolothiono - 1 - hydroxyethyl)cyclohexyl]phosphorothiolothionate*

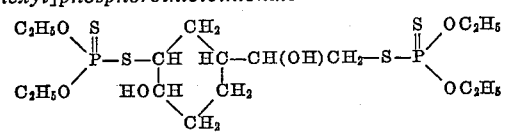

The addition product of 2 moles of diethyl phosphorothiolothionate to 1 mole of vinylcyclohexane dioxide was obtained by the same reaction procedure as described in Example 1. The phosphorus analysis of this product showed that the phosphorothiolothionate had added to both epoxy groups.

*Example 4.—O,O-diethyl S(2-hydroxy-5-vinylcyclohexyl)phosphorothiolothionate*

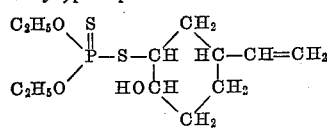

The addition product of 1 mole of vinylcyclohexene monoxide to 1 mole of diethyl phosphorothiolothionate was obtained by the same reaction procedure as described in Example 1. The product had a refractive index of $n_D^{20}$ —1.5277.

*Example 5.—O,O-diethyl S{[2 - hydroxy - 5 - (1 - diethylphosphorothiolothiono)ethyl]cyclohexyl}phosphorothiolothionate*

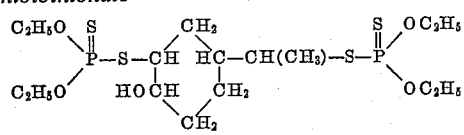

The addition product of 1 mole of vinylcyclohexene monoxide to 2 moles of diethyl phosphorothiolothionate was obtained by the same reaction procedure as described in Example 1. Analysis for phosphorus showed that the phosphorothiolothionate had added to the vinyl group as well as to the epoxy group.

*Example 6*

The usefulness of the above compounds as insecticides is illustrated in experiments using mites in the following manner. Acetone solutions containing 5% of the candidate compounds were prepared and diluted with water to give a solution containing the desired concentrations for testing. Two heavily infested bean leaves containing adult two-spotted mites (*T. bimaculatus*) were carefully dipped in the above solutions and dried in a gentle air stream. The leaves were then placed on damp paper toweling in Petri dishes and observed after 24 hrs. for mortality among adult mites. It should be noted that tests using acetone-water solutions (containing none of the toxicant) kill none of the mites.

| Run | Concentration in p.p.m. | Percent kill mites |
|---|---|---|
| (1) Blank | 0 | 0 |
| (2) O,O-diethyl S-(2-hydroxy-5-epoxyethylcyclohexyl) phosphorothiolothionate | 1,000 / 100 | 100 / 82 |
| (3) O,O-diethyl S-[2-hydroxy-5-(2-diethylphosphorothiolothiono - 1 - hydroxyethyl)-cyclohexyl] phosphorothiolothionate | 1,000 / 100 | 100 / — |
| (4) O,O-diethyl S-(2-hydroxy-5-vinylcyclohexyl) phosphorothiolothionate | 1,000 / 100 | 99 / 76 |

The compounds illustrated by the other examples were also effective when tested against mites.

We claim:

1. As a composition of matter, organophosphorus compounds having the formula:

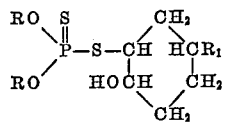

wherein $R_1$ is selected from the group consisting of hydrogen,

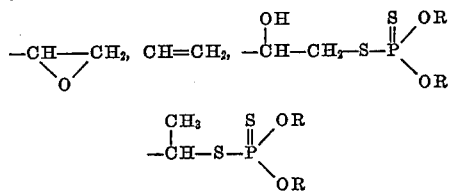

wherein R in the structural formula and in the definition of $R_1$ is a lower alkyl radical containing from 1 to 4 carbon atoms.

2. As a composition of matter, O,O-diethyl S-(2-hydroxycyclohexyl) phosphorothiolothionate.

3. As a composition of matter, O,O-diethyl S-(2-hydroxy-5-epoxyethylcyclohexyl) phosphorothiolothionate.

4. As a composition of matter, O,O-diethyl S-[2-hydroxy-5-(2 - diethylphosphorothiolothiono - 1 - hydroxyethyl)cyclohexyl]phosphorothiolothionate.

5. As a composition of matter, O,O-diethyl S(2-hydroxy-5-vinylcyclohexyl)phosphorothiolothionate.

6. As a composition of matter, O,O-diethyl S{[2-hydroxy-5 - (1 - diethylphosphorothiolothiono)ethyl]cyclohexyl}phosphorothiolothionate.

7. The method for producing new organophosphorus compounds which comprises reacting a dialkyl phosphorothiolothionate, wherein the alkyl radicals contain from 1 to 4 carbon atoms, with an epoxide having the formula:

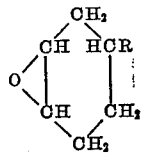

wherein R is selected from the group consisting of hydrogen,

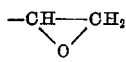

and —CH=CH₂ at a temperature within the range of 0 to 150° C.

8. The method for producing O,O-diethyl S-(2-hydroxycyclohexyl)phosphorothiolothionate which comprises reacting 1,2-epoxycyclohexane with O,O-diethyl phosphorothiolothionate at a temperature within the range of 0 to 150° C.

9. The method for producing O,O-diethyl S-(2-hydroxy-5 - epoxyethylcyclohexyl)phosphorothiolothionate which comprises reacting substantially equimolar amounts of vinylcyclohexene dioxide and diethyl phosphorothiolothionate at a temperature within the range of 0 to 150° C.

10. The method for producing O,O-diethyl S-[2-hydroxy - 5 - (2 - diethylphosphorothiolothiono-1-hydroxyethyl)cyclohexyl]phosphorothiolothionate which comprises reacting one mole of vinylcyclohexene dioxide with at least two moles of diethyl phosphorotriolothionate at a temperature within the range of 0 to 150° C.

11. The method for producing O,O-diethyl S(2-hydroxy-5-vinylcyclohexyl)phosphorothiolothionate which comprises reacting substantially equimolar amounts of vinylcyclohexene monoxide and diethyl phosphorothiolothionate at a temperature within the range of 0 to 150° C.

12. The method for producing O,O-diethyl S{[2-hydroxy-5 - (1 - diethylphosphorothiolothiono)ethyl]cyclohexyl} phosphorothiolothionate which comprises reacting one mole of vinylcyclohexene monoxide with at least two moles of diethyl phosphorothiolothionate at a temperature within the range of 0 to 150° C.

References Cited in the file of this patent
UNITED STATES PATENTS
2,783,202    McDermott _____ Feb. 26, 1957

OTHER REFERENCES

Fischer et al.: German application, Ser. No. D18787, printed March 8, 1956.